US009564820B2

(12) United States Patent
DiGiacomo et al.

(10) Patent No.: US 9,564,820 B2
(45) Date of Patent: Feb. 7, 2017

(54) METHODS AND SYSTEMS FOR CONTROL OF DC-DC CONVERTERS

(71) Applicant: LINEAR TECHNOLOGY CORPORATION, Milpitas, CA (US)

(72) Inventors: Thomas Anthony DiGiacomo, Cary, NC (US); Michael George Negrete, Mountain View, CA (US)

(73) Assignee: Linear Technology Corporation, Milpitas, CA (US)

( * ) Notice: Subject to any disclaimer, the term of this patent is extended or adjusted under 35 U.S.C. 154(b) by 400 days.

(21) Appl. No.: 13/843,572

(22) Filed: Mar. 15, 2013

(65) Prior Publication Data

US 2014/0268909 A1 Sep. 18, 2014

(51) Int. Cl.
*H02M 3/335* (2006.01)
*H02M 1/00* (2006.01)

(52) U.S. Cl.
CPC . *H02M 3/33553* (2013.01); *H02M 2001/0003* (2013.01)

(58) Field of Classification Search
CPC .............. H02M 3/335; H02M 3/33523; H02M 3/33507; H02M 3/33569; H02M 3/33561; H02M 3/156; H02M 3/33515; H02M 3/33538; H02M 3/00; H02M 3/1584; H02M 3/157
USPC ................................ 363/21.04–21.05, 21.07, 21.1–21.11,363/78–80, 95, 97, 125–126, 131
See application file for complete search history.

(56) References Cited

U.S. PATENT DOCUMENTS

| 4,117,411 | A | 9/1978 | Goble |
| 5,335,162 | A * | 8/1994 | Martin-Lopez et al. ....... 363/97 |
| 7,672,146 | B2 * | 3/2010 | Park et al. ................. 363/21.01 |
| 7,961,484 | B2 * | 6/2011 | Lalithambika et al. ... 363/56.09 |
| 8,288,954 | B2 | 10/2012 | Melanson |
| 2003/0142513 | A1 * | 7/2003 | Vinciarelli .............. H02J 1/102 363/17 |
| 2006/0077697 | A1 | 4/2006 | Yang |
| 2007/0121349 | A1 * | 5/2007 | Mednik et al. ............ 363/21.01 |
| 2012/0002451 | A1 * | 1/2012 | Djenguerian et al. .......... 363/78 |
| 2013/0181635 | A1 * | 7/2013 | Ling ............................. 315/297 |

OTHER PUBLICATIONS

Single Switch Synchronous Forward Controller, LT1952/LT1952-1, pp. 1-28, Linear Technology Corporation 2004.
(Continued)

*Primary Examiner* — Jue Zhang
*Assistant Examiner* — Kevin H Sprenger
(74) *Attorney, Agent, or Firm* — Han Santos Reich, PLLC (57) ABSTRACT

Switching regulator methods and systems for supplying output current at a regulated voltage level to a load. The regulator has a primary side that is galvanically isolated from a secondary side. The regulator includes a transformer having a primary winding on the primary side and a secondary winding on the secondary side, coupled to a load. A switch, coupled to the primary winding, controls current flow through the primary winding. A first feedback control loop, responsive only to primary side signal values, regulates a constant average voltage at the output node. An optional second feedback control loop, responsive only to primary side signal values, reduces voltage ringing at the output node.

23 Claims, 7 Drawing Sheets

(56) References Cited

OTHER PUBLICATIONS

Simple Circuit Replaces and Improves on Power Modules at Less Than Half the Price—Design Note 347, Linear Technology Design Notes Advertisement, 2 pgs., Linear Technology Corporation 2004.
Simplify 25W-300W Power Supply Design with Single Switch Synchronous Forward Controller, LTC News for Immediate Release—Sep. 13, 2004.
Mammano, Robert, "Switching Power Supply Topology Voltage Mode vs. Current Mode," pp. 1-4, Unitrode Design Note DN-62, Unitrode Corporation (1999).
Lee et al., "A New Sensorless Control Scheme Using Simple Duty Feedback Technique in DC/DC Converters", Dec. 2002, pp. 554-562.

* cited by examiner

METHODS AND SYSTEMS FOR CONTROL OF DC-DC CONVERTERS

TECHNICAL FIELD

This disclosure generally relates to the electrical arts, and more particularly to voltage regulation of power supplies.

DESCRIPTION OF RELATED ART

In recent years there has been an effort to improve the accuracy and reliability of voltage regulators. Voltage regulators are power supply circuits that provide a predetermined and substantially constant output voltage, even while using an input voltage source which may be poorly specified. Furthermore, many electronic products use voltage regulators to convert an input voltage into a regulated output voltage that may be higher or lower than the input voltage. Accordingly, voltage regulators may function as both a voltage converter and a voltage stabilizer.

There are two major categories of regulators, namely linear regulators and switching regulators. In a linear regulator, the output voltage may be regulated by adjusting a passive element (e.g., a variable resistor) or an active element (e.g., a bipolar junction transistor) to control a continuous flow of current from the voltage source to the load.

On the other hand, switching regulators are essentially DC-DC converters that operate by switching current ON and OFF to control the output voltage. Switching regulators may employ one or more switching devices, along with an inductor and a capacitor in order to store and transfer energy to a load. Such regulators control the voltage supplied to the load by turning the switching element(s) ON and OFF, thereby regulating the amount of power being transmitted through the inductor in the form of discrete current pulses. For example, the inductor and the capacitor filter the supplied current pulses into a substantially constant load current such that the load voltage is regulated. Accordingly, regulation of the output voltage may be achieved through the ON-OFF duty cycle adjustment of the switching element(s), based on feedback signals indicative of the output voltage and load current.

Switching regulators can be classified according to the circuit topology. One distinction is between isolated and non-isolated regulators. Isolated regulators differ from non-isolated ones in that they include a transformer. Accordingly, the primary side of the transformer is galvanically isolated from the secondary side. For example, galvanic separation between the input source and the supply rail is often used to meet safety requirements or to reduce system noise.

Isolated regulators include forward and flyback topology converters. A flyback converter stores energy as a magnetic field in an inductor air-gap during the time the converter switching element (e.g., transistor) is conducting. When the switch turns OFF, the stored magnetic field collapses and the energy is transferred to the output of the flyback converter as electric current. The flyback converter can be viewed as two inductors sharing a common core.

In contrast, the forward converter (which is based on a transformer) does not store energy during the conduction time of the switching element. Instead, energy is passed directly to the output of the forward converter by transformer action during the switch conduction phase. Thus, the forward converter is a DC/DC converter that uses the transformer to increase or decrease the output voltage (depending on the transformer ratio) and provide galvanic isolation for the load. With multiple output windings, it is possible to provide both higher and lower voltage outputs.

Figure 1:
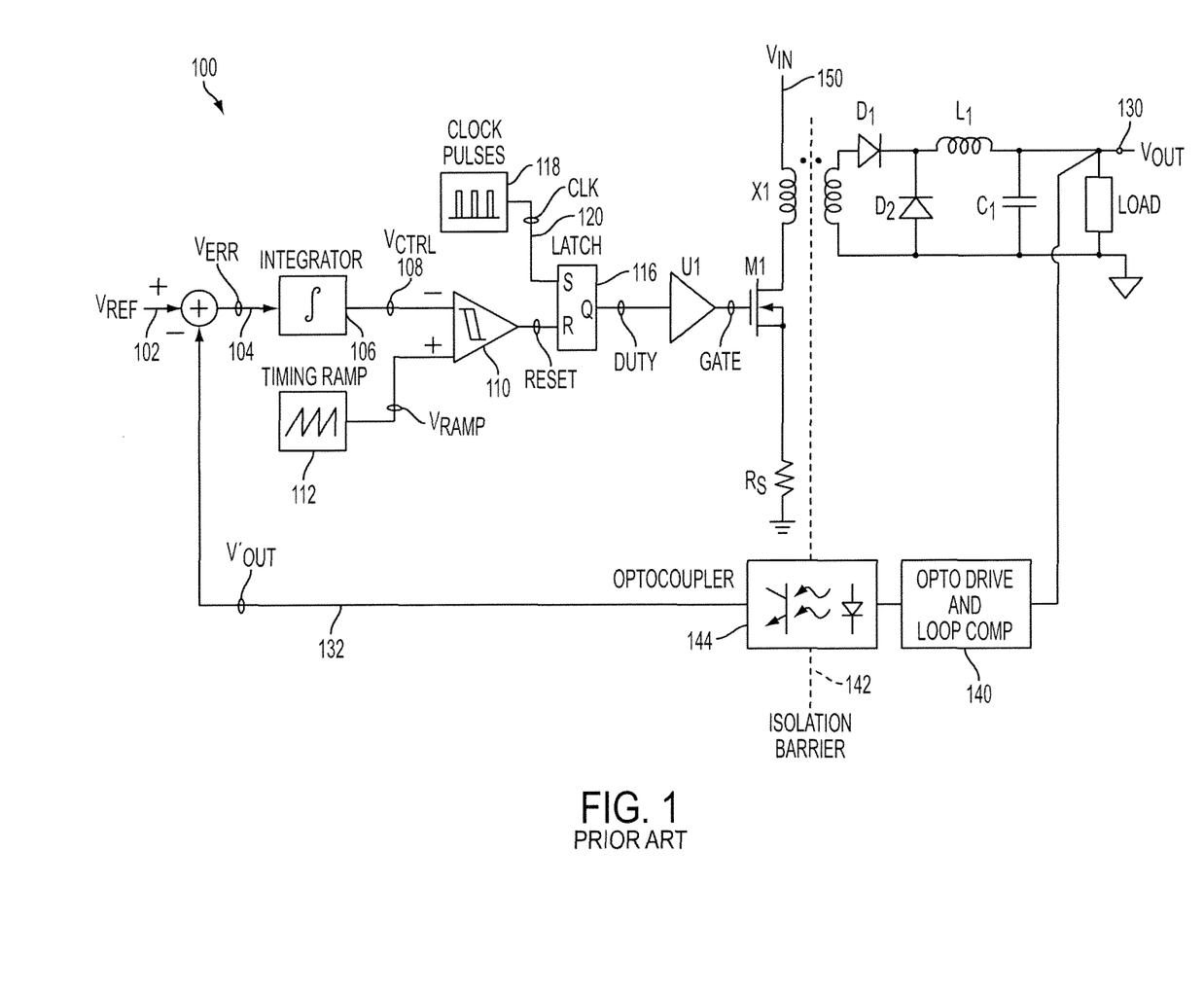
FIG. 1 illustrates a conventional forward-topology DC-DC voltage mode converter.

Isolated forward-topology DC-DC converters typically rely on one of two common control methods: (i) voltage mode control and (ii) current mode control. In this regard, FIG. 1 illustrates a forward-topology DC-DC voltage mode converter. In the voltage mode control circuit 100 of FIG. 1, the difference between a reference signal $V_{REF}$ at node 102 and the output feedback signal $V'_{OUT}$ at node 132, is provided as an error signal $V_{ERR}$ at node 104. The feedback signal $V'_{OUT}$ at node 132 is created by the output signal $V_{OUT}$ at node 130 as it travels through an optocoupler driver and loop compensation block 140 and is translated through the isolation barrier 142 by an optocoupler 144. The error signal $V_{ERR}$ at node 104 is time-integrated by integrator 106 to provide a control signal $V_{CTRL}$ at node 108. A comparator 110 compares the $V_{CTRL}$ signal to a $V_{RAMP}$ signal provided by a timing ramp circuit 112 and provides a RESET signal to a latch 116. A clock pulse generator 118 provides a CLK signal at the set node 120 of the latch 116. The latch 116 provides a DUTY signal (e.g., pulse) at its output that is latched ON by a clock (CLK) edge and latched OFF when the RESET signal is asserted.

The rest of the circuit 100 is part of the forward converter, as will be understood by those skilled in the art. The driver U1, switch M1, transformer X1, and forward diode $D_1$ apply a positive voltage difference across output inductor $L_1$ to increase its current while the switch M1 is ON (e.g., while DUTY is high), and catch diode $D_2$ applies a negative voltage difference across output inductor $L_1$ to decrease its current while the switch M1 is OFF (e.g., while DUTY is low). The capacitor $C_1$ filters the rippling inductor $L_1$ current and produces output signal $V_{OUT}$ at node 130. A voltage feed-forward technique is often applied, wherein the timing ramp slope is made proportional to the input voltage $V_{IN}$ at node 150 to reduce loop gain variation and improve line response.

Figure 2:
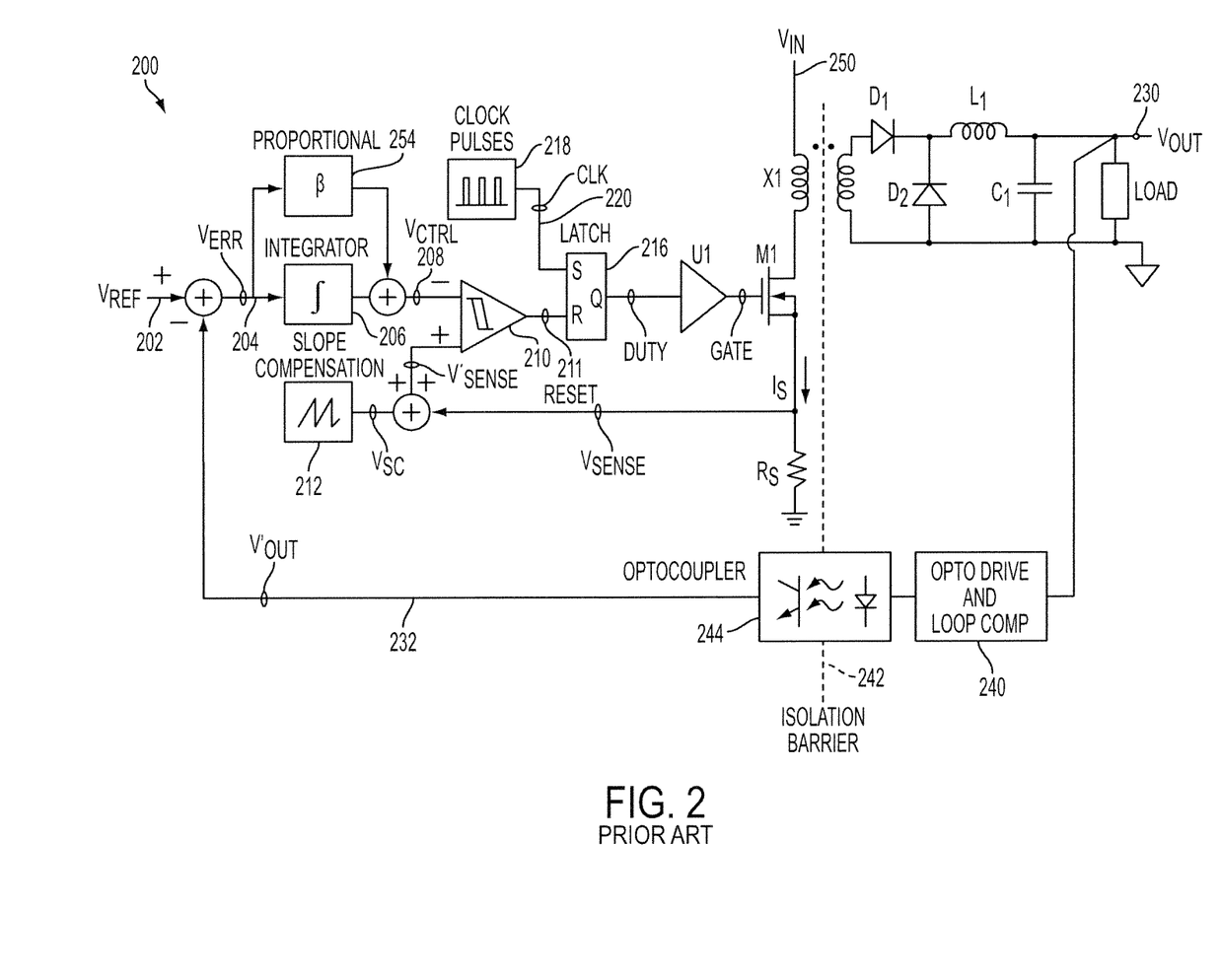
FIG. 2 illustrates a conventional forward-topology DC-DC current mode converter.

For many applications, switching regulators that operate in a current-mode are particularly desirable. In this regard, FIG. 2 illustrates a forward-topology DC-DC current mode converter. For example, current-mode switching regulators can provide good line and load transient signal rejection, and can offer inherent current-limiting capabilities during fault conditions (e.g., output short circuits). Further, some conventional current-mode switching regulators monitor the inductor current and compare it with a peak inductor current level to determine when it is appropriate to turn OFF the main switching element, thereby eliminating the supply of excess current.

In the current mode control circuit 200 of FIG. 2, the difference between a reference signal ($V_{REF}$) and the output feedback signal $V'_{OUT}$ at node 232, is provided as an error signal $V_{ERR}$ at node 204. The feedback signal $V'_{OUT}$ at node 232 is created by the output signal $V_{OUT}$ at node 230 as $V_{OUT}$ travels through an optocoupler driver and loop compensation block 240 and is translated through the isolation barrier 242 by an optocoupler 244. The $V_{ERR}$ signal at node 204 is time-integrated by integrator 206 and scaled by circuit 254 (i.e., a zero is placed in the transfer function) to provide a control signal $V_{CTRL}$ at node 208. Comparator 210 compares the control signal $V_{CTRL}$ at node 208 to the sum of the peak switch current (e.g., $V_{SENSE}=I_S \cdot R_S$) and the slope compensation circuit 212 at each clock period. Alternatively, the average switch current is developed and used for comparison. The output of the comparator 210 provides a RESET signal to latch 216. A clock pulse generator 218 provides a CLK signal at the SET node 220 of the latch 216.

The latch 216 provides a DUTY signal at its output that is latched ON by a clock CLK edge and latched OFF when the RESET signal is asserted.

The rest of the circuit 200 is part of the forward converter. The driver U1, switch M1, transformer X1, and forward diode $D_1$ apply a positive voltage difference across the output inductor $L_1$ to increase its current while the switch M1 is ON (e.g., while DUTY is high), and catch diode $D_2$ applies a negative voltage difference across the output inductor $L_1$ to decrease its current while the switch M1 is OFF (e.g., while DUTY is low). The capacitor $C_1$ filters the rippling inductor $L_1$ current and produces output signal $V_{OUT}$ at node 230. For example, the signal $V_{SC}$ (at the output of the slope compensation circuit 212) ramps down the effective control level over the course of each period, thereby correcting sub-harmonic instability for duty cycles above 50%.

Both voltage mode and current mode regulators discussed above rely on output voltage feedback. Isolated converters with output voltage feedback typically include an optoisolator (e.g., 244) in the feedback path. However, adding any element to the feedback path introduces error and loop delay. Further, the additional elements increase power dissipation, increase parts/costs, and add to circuit complexity and instability. Indeed, the performance of optoisolators varies widely with bias, temperature, and age, thereby increasing design complexity and reducing system reliability. Thus, using the traditional output voltage feedback loop to determine duty cycle is vulnerable to the unreliable and complex feedback through the isolation barrier.

Recent developments in primary-side sensing technology, where the output voltage and current are regulated by monitoring the information in the primary side of the power supply only, have simplified voltage regulation by eliminating all secondary-feedback circuitry (e.g., from the secondary side of the transformer). Primary-side sensing for regulated forward converters may limit the switch duty cycle to avoid saturating the transformer core with too much magnetic flux (i.e., a volt-second clamp based upon $V_{IN}$). This volt-second clamp is used as a backup or safety limit for (and may therefore be less accurate than) the primary mode of regulation based on output voltage feedback. The volt-second clamp is typically implemented as a capacitor timer with a charging current derived from $V_{IN}$, where the current is scaled to provide an independent timer function consistent with the overall switching period set by its fixed frequency oscillator. While primary-side sensing can reduce circuit complexity, the DC voltage regulation accuracy is generally poor using the capacitor timer volt-second clamp approach as a primary mode of regulation. The errors due to device matching between two separate timer blocks (i.e., one for the duty clamp and the other for the oscillator frequency), further compounded with comparator settling and switching delays, result in a relatively inaccurate duty cycle. Further, the dual capacitor timer method of the volt-second clamp approach may require a precise subdivision of the period of the switching oscillator, which makes synchronization to external clocks and shared multiphase outputs difficult to implement.

In view of the foregoing, it would be desirable to provide circuits and methods for a regulated output voltage via primary side control with improved DC regulation accuracy. It would also be desirable to improve output voltage ringing induced by load changes, which may occur when the output voltage feedback is not employed.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below relate to primary-side regulated switching regulators. In one aspect, a regulator includes a primary side that is galvanically isolated from a secondary side. The regulator further includes a transformer that has a primary winding on the primary side and a secondary winding on the secondary side. There is an input node on the primary side and an output node on the secondary side, where the output node is coupled to a load. A switch is coupled to the primary winding and configured to control current flow through the primary winding. A first feedback control loop, based on only primary side signal values, regulates a constant average voltage at the output node. Accordingly, feedback between the galvanically isolated barrier between the input and output of the regulator is eliminated.

In one aspect, the product of a Pulse Width Modulation (PWM) duty cycle and the input voltage is used to create a replica of the modulated power path signal of the regulated output. In another aspect, a current of the switching element on the primary side of the galvanically isolated barrier is monitored to improve the output step response (e.g., output ringing due to load variation).

Figure 3:
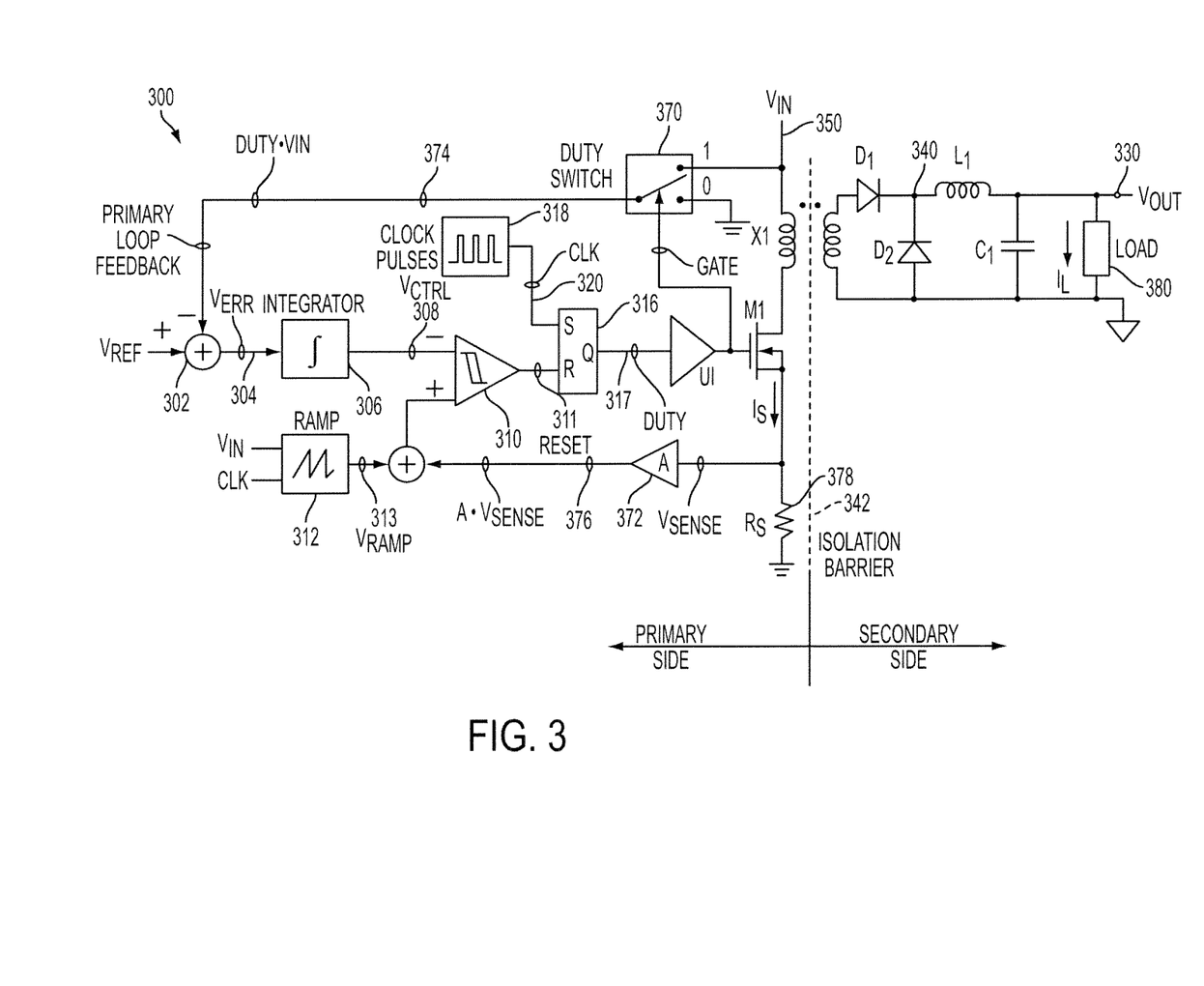
FIG. 3 illustrates a DC-DC switching voltage regulator consistent with an embodiment of the invention.

Reference now is made in detail to the examples illustrated in the accompanying drawings and discussed below. FIG. 3 illustrates a DC-DC switching voltage regulator consistent with an embodiment of the present invention. By way of example, circuit 300 is configured in a forward topology, (e.g., a form of the buck topology), although it will be understood that other known topologies are supported as well. Circuit 300 includes a primary side (i.e., to the left of the isolation barrier 342) and a secondary side (to the right of the isolation barrier 342). Accordingly, the topology depicted in the example of FIG. 3 can be described as a "buck-derived forward converter." This forward topology comprises switch M1 on the primary side of the isolation barrier 342, transformer X1 that straddles the isolation barrier 342, and diodes $D_1$ and $D_2$, inductor $L_1$, capacitor $C_1$ and the load 380) on the secondary side of the isolation barrier 342.

Circuit 300 includes two feedback loops: (i) a first loop including $V_{IN}$ via path 374, and (ii) an optional second loop including $I_S$ via path 376. The first loop, which sets the duty cycle based on $V_{IN}$, is a single-pole loop that can be easily compensated, as will be described later. The second feedback loop damps output ringing and can be set by choosing a first loop time constant that matches another time constant in the system. In one embodiment, the damping response is better controlled by choosing a first loop time constant that matches another time constant in the system and the second feedback loop gain. In yet another embodiment, the feedback loop gain may be fixed to a value to provide adequate damping control over a range of operation.

In one embodiment, the first feedback loop control stands on its own (i.e., there is no second feedback loop), which affords advantages if output voltage ringing is limited (e.g., by load resistance) or if output voltage ringing can be tolerated. The loop bandwidth may be chosen to create a fast loop, so that duty cycle closely tracks $V_{IN}$ dynamics, or a slow loop, so that $V_{IN}$ dynamics are highly filtered. The latter improves input noise and high-frequency rejection, while the former eases transformer core saturation concerns by maintaining a constant volt-second product even during fast $V_{IN}$ changes.

In the circuit 300 of FIG. 3, the difference between a reference signal $V_{REF}$ at node 302 and the first loop feedback signal at node 374, is provided as an error signal $V_{ERR}$ at node 304. The first loop feedback signal at node 374 is a function of the input voltage $V_{IN}$ at node 350 and the duty cycle provided by the duty switch 370. The first feedback signal is discussed in greater detail later. The error signal $V_{ERR}$ at node 304 is time-integrated by integrator 306 to provide a control signal $V_{CTRL}$ at node 308. A comparator 310 compares the $V_{CTRL}$ signal to a $V_{RAMP}$ signal provided by a timing ramp 312 and provides a RESET signal to a latch 316. A clock pulse generator 318 provides a CLK signal at the SET node 320 of the latch 316. The latch 316 provides a DUTY signal at its output that is latched ON by a first (e.g., positive) clock CLK edge and latched OFF when the RESET signal is asserted (e.g., first edge of the reset signal).

The driver U1 is coupled to the output of the latch 316 and thus receives the DUTY signal to drive the duty cycle of the switch transistor M1. The switch M1 is configured to allow current to flow through the primary winding of transistor X1 in a first state and no current to flow in the second state. In one embodiment, transistor M1 is a MOSFET. Driver U1, switch M1, transformer X1, and forward diode $D_1$, apply a positive voltage difference across output inductor $L_1$ to increase its current while the switch M1 is ON, and catch diode D2 applies a negative voltage difference across output inductor $L_1$ to decrease its current while the switch M1 is OFF. The capacitor $C_1$ filters the rippling inductor $L_1$ current and produces output signal $V_{OUT}$ at node 330.

As noted above, circuit 300 may also include an optional second feedback loop to control (e.g., dampen) the ringing at the output 330. For example, the source of the switch transistor M1 is coupled to a sense resistor $R_S$ 378 to monitor the current $I_S$ flowing through the primary coil of transformer X1 when the switch M1 is closed. The primary current is representative of the current flowing through the secondary coil of transformer X1, diode D1, and inductor $L_1$ when the switch M1 is closed. The sense resistor 378 converts the current $I_S$ into a voltage and provides it to an amplifier (i.e., $V_{SENSE}$ 372). The amplified $V_{SENSE}$ signal is summed with a ramp signal provided by a timing ramp 312 and provided to the comparator 310. The operation of the second feedback loop is discussed in more detail in a later section.

It should be noted that transformers are constrained in their performance by the magnetic flux limitations of the core. Ferromagnetic materials cannot support very high magnetic flux densities. Indeed, they tend to saturate at a certain level (e.g., dictated by the material and core dimensions). In this regard, typical forward converters usually include separate volt-second clamp circuitry to limit the flux by limiting the time the input voltage is applied to the transformer during each switching period. Because the converters of the prior art are typically focused on output sensing, voltage mode and current mode controllers of the prior art have no inherent limiting of the volt-seconds applied to the transformer, especially during transients.

In this regard, in one embodiment, the first loop control discussed herein inherently maintains a constant $DUTY \cdot V_{IN}$. For example, in the prior art, if abrupt load current changes alter the output voltage, Voltage Mode or Current Mode control may transiently drive the duty cycle to a point where the core of the transformer X1 may eventually saturate. In contrast, in one embodiment, the saturation of the transformer X1 core is inherently prevented by regulating the duty cycle of the transformer X1 inversely to the input voltage $V_{IN}$ 350. The tighter control over the maximum volt-seconds allows the use of a physically smaller transformer.

With the foregoing overview of the system, it may be helpful now to describe some of the functional building blocks of the switching regulator circuit 300. The duty switch 370 provides an output signal at node 374 that is analogous to a PWM power path formed by the driver U1, switch M1, transformer X1, and diodes $D_1$ and $D_2$. For example, both the signal at node 374 and the PWM power path provide a PWM signal that is scaled by the input voltage $V_{IN}$. Put differently, the signal at node 374 provides a replica modulation path (minus the transformer), thereby replacing the output feedback over the galvanically isolated barrier 342 of traditional approaches with a local signal at node 374 on the primary side (e.g., a representative copy of the signal at node 340 of the secondary side).

Figure 4:
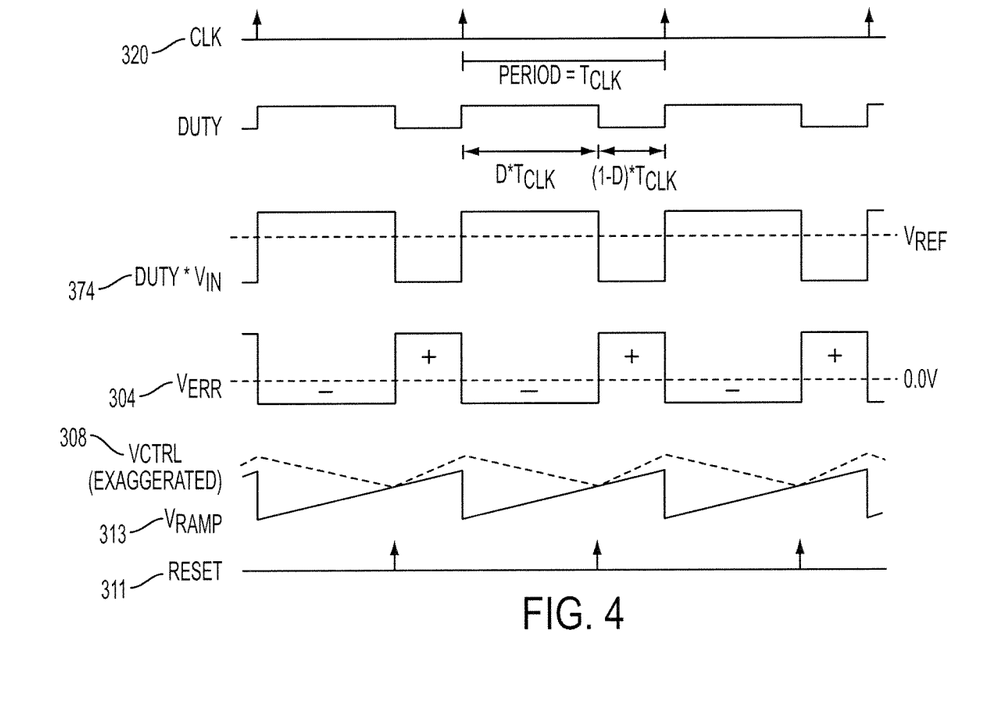
FIG. 4 is an exemplary timing diagram consistent with an embodiment of the invention.

The integrator 306 and other loop gain elements (e.g., comparator 310, ramp circuit 312, latch 316, driver U1, and duty switch 370) set a simple single-pole control loop. In contrast, the voltage mode control circuit 100 of the prior art discussed above has a feedback path with two poles (e.g., of the L-C filter), which complicates and limits loop compensation. For example, the integrator 306 of circuit 300 provides theoretically infinite (e.g., in practice, very high) DC loop gain that drives the cycle-by-cycle error signal ($V_{ERR}$) at node 304 to zero. FIG. 4 provides an exemplary timing diagram for the circuit 300, consistent with an embodiment of the operation discussed herein. Graphically, the reference signal $V_{REF}$ cuts the first loop feedback signal of node 374 (i.e., $DUTY \cdot V_{IN}$) into a negative pulse area and a positive pulse area that the loop attempts to equalize (see Equations 1a and 1b below).

$$(V_{REF} - V_{IN}) \cdot DT_{CLK} + (V_{REF} - 0V) \cdot (1-D)T_{CLK} = 0 \quad \text{[1a]}$$

$$D = \frac{V_{REF}}{V_{IN}} \quad \text{[1b]}$$

In Equations 1a and 1b above, "D" represents the duty cycle and "$T_{CLK}$" represents the period of the clock signal 320, and thus the switching period of the converter.

Finite output impedance and any leakage current of the integrator 306 contribute to PWM duty ratio errors, which translate into voltage errors at output 330.

The timing ramp 312 and comparator 310 perform voltage-to-time conversion. For example, the higher the control voltage $V_{CTRL}$ at node 308, the longer the $V_{RAMP}$ signal at node 313 ramps until the comparator 310 trips. In various embodiments, a monotonic, non-linear ramp will be functional, but a linear ramp preserves loop bandwidth and noise immunity versus duty cycle. In one embodiment, voltage feed-forward is used to maintain constant bandwidth versus input voltage $V_{IN}$ (at node 350). For example, voltage feed-forward can be provided by varying the slope of the reference ramp $V_{RAMP}$ 313 in direct proportion to $V_{IN}$ 350. Accordingly, the time output from the voltage-to-time block (i.e., comparator 310) then varies in inverse proportion to $V_{IN}$ 350. Comparator 310 and ramp 312 offsets provide constant errors that the integrator 306 gain attenuates. Ramp 312 slope error ($V_{RAMP}$ at node 313) alters the first loop bandwidth. The errors discussed above change the control signal ($V_{CTRL}$ at node 308) level's steady state value. Non-linear ramps 313 resemble variable slopes, which alter the first loop bandwidth with duty cycle.

For example, the magnitude and slope of the $V_{RAMP}$ signal 313 matter insofar as the comparator 310 can correctly discriminate between the control signal 308 ($V_{CTRL}$) and the ramp signal 313 ($V_{RAMP}$) over the practical range and ripple of control signal 308 in the presence of electrical noise and comparator offset. Thus, $V_{RAMP}$ signal 313 of ramp circuit 312 need not provide a perfect slope or timing to achieve a proper duty cycle (e.g., time the signal at the gate of transistor M1 is ON to OFF), as long as $V_{RAMP}$ 313 is monotonic and has little cycle-to-cycle variation.

The latch 316 of circuit 300 is configured to perform time-to-duty ratio conversion. For example, the time between consecutive clock pulses (the switching period $T_{CLK}$) represents 100% of the duty cycle. The RESET signal position relative to the "set" clock CLK 320 pulse in each cycle provides the duty percentage. In one embodiment, the integrator 306 attenuates the effect of any constant latch delay on the duty cycle. In one embodiment, the latch 316 is an S-R latch.

In one embodiment, the DUTY signal at the output of the latch 316, drives the actual power path modulator, which includes the transistor switch driver U1, transistor switch M1, transformer X1, and diodes $D_1$ and $D_2$ (e.g., for non-synchronous operation). For switching that is sharp-edged and where the diodes (e.g., $D_1$ and $D_2$) are ideal, the output $V_{OUT}$ 330 is a PWM signal with amplitude that is provided by Equation 2 below:

$$V_{OUT} = \frac{D \cdot V_{IN}}{N_{pri}/N_{sec}} \quad \text{[2]}$$

In Equation 2 above, $N_{pri}$ is the number of turns in the primary coil and $N_{sec}$ is the number of turns in the secondary coil of the transformer X1.

As to the L-C filter, comprising inductor $L_1$ and capacitor $C_1$ at the secondary side, it extracts the time-averaged voltage at the output $V_{OUT}$ 330 with a damping factor controlled by the resistance of the load 380 and the parasitic resistances of the inductor $L_1$ and capacitor $C_1$.

In one embodiment, the first loop feedback variable includes the product of the input voltage $V_{IN}$ at node 350 and the pre-gate drive signal (DUTY) at node 317, which is formed at the output of the duty switch 370. For each cycle, the PWM ON period begins when the system clock CLK 320 sets the latch 316. In the example of FIG. 3, the first loop feedback product (DUTY·$V_{IN}$) is subtracted from a reference level ($V_{REF}$) to form an error signal $V_{ERR}$ at node 304. The error signal $V_{ERR}$ is integrated over time (by integrator 306) into a control level $V_{CTRL}$ at node 308. A timing ramp $V_{RAMP}$ (provided by ramp circuit 312) and the amplified switch current (A·$I_S$) are summed. For example, the comparator 310 provides a reset signal (RESET) at node 311 that clears the ON time (e.g., S-R) latch when the control level $V_{CTRL}$ 308 exceeds the sum. As to the driver (U1), switch (M1), transformer (X1), diodes ($D_1$, $D_2$), inductor ($L_1$), and the capacitor ($C_1$), they form an open-loop forward converter. The forward converter modulates the input source voltage $V_{IN}$ 350 as dictated by the PWM controller, and passes the result through the L-C filter ($L_1$ and $C_1$ on the secondary side).

In various embodiments, the first loop feedback signal (DUTY·$V_{IN}$) may be achieved in different ways. As shown in FIG. 3, a signal at the GATE node of switch M1 could simply control the connection of $V_{IN}$ 350 or ground (e.g., zero volts) to the summing node 302 of the integrator 306. Similarly, the duty switch 370 could provide a current proportional to $V_{IN}$ 350 via a series resistor (not shown), or a voltage-to-current converter sub-circuit (not shown), to the summing node 302 of the integrator 306 when the GATE signal is HIGH (e.g., the switch M1 is in a first state) and sever the path to $V_{IN}$ when the GATE signal is low (e.g., the switch M1 is in a second state). In both embodiments described above, the DUTY signal 317 may be substituted for the GATE signal (not shown) as a control or input signal to the Duty Switch 370. Further, a voltage proportional to $V_{IN}$ 350 may substitute for $V_{IN}$ (not shown). In one embodiment, a translinear analog multiplier circuit (not shown) could provide the product (DUTY·$V_{IN}$) signal, by using an appropriately conditioned DUTY signal 317 or GATE signal and $V_{IN}$ 350 as inputs.

In yet another embodiment, a tertiary winding of the transformer X1 with forward and catch diodes and a small load (not shown) also may provide a signal that is the product of the input voltage and the duty cycle. For example, adding an output L-C to such product would create a replica of the voltage at the output node $V_{OUT}$ 330.

In one aspect, a constant average load current $I_L$ adds a fixed offset to the timing ramp $V_{RAMP}$ 313 that the first feedback loop integrator 306 absorbs into the steady-state (average) level of $V_{CTRL}$ 308. However, load steps (e.g., a change in the load 380) that cause the output voltage $V_{OUT}$ 330 to ring also induce a ringing current in inductor $L_1$. This ringing current is also reflected through the transformer X1 to the main switch M1. Accordingly, this variation current due to the output voltage $V_{OUT}$ 330 ringing is also reflected across the current sense resistor $R_S$ 378 on the primary side of the isolation barrier 342. Thus, the transient portion of the current $I_S$ is converted into a voltage by sense resistor $R_S$ 378 and amplified into a ringing variation of the ramp level $V_{RAMP}$ 313. By proper scaling of the amplification of the feedback and the time constant of the integrator 310 to the output tank time constant [squareroot($L_1 \cdot C_1$)], the duty cycle is modulated so as to damp (e.g., critically damp) the ripple at the output voltage $V_{OUT}$ 330. In one embodiment, the duty cycle is modulated to dampen the ripple by the second feedback loop mentioned above.

In one embodiment of the second feedback loop, a signal derived from the inductor current ($I_S$) is high-pass filtered and used to reduce the voltage driving the inductor $L_1$. In this regard, the first feedback loop provides a signal input point just after the integrator (e.g., input to comparator 310) that provides the high pass filter (HPF) function as well as the subtraction function (i.e., reduction of the duty cycle).

For example, without $I_S$ current sensing feedback via sense resistor $R_S$ 378 at the primary side of the isolation barrier 342, the output stage may appear like a pulsed voltage source (e.g., a primary side of transformer X1 with a switched $V_{IN}$ applied and a secondary side driving the diode $D_1$ and $D_2$ switches) driving a low pass L-C filter ($L_1$ and $C_1$). Output load current $I_L$ changes alter the voltage at $V_{OUT}$ 330, thereby changing the current through the inductor current $L_1$ by changing the voltage across it, thereby exciting the L-C circuit to ring if there is not sufficient damping resistance.

The inductor $L_1$ current forces the voltage at node 340 to track the output voltage at node 330. Accordingly, the voltage across the inductor $L_1$ is changed less, so the current through inductor $L_1$ changes less, thereby curbing the L-C tank ring stimulus. The high pass filtering of the inductor current allows the higher frequency ringing components to be tracked out and the lower frequency and DC current components to pass. The inductor average current may change to match the new load current $I_L$ with much less oscillation. For example, the high pass filter corner relation to the L-C tank resonance frequency determines the amount of damping.

Accordingly, in the second feedback loop, the output voltage 330 ringing due to load current $I_L$ changes that excite the output L-C tank is damped by the switch current feedback. An increase in switch current adds to the timing ramp, temporarily reducing the duty cycle and maintaining the same average current through the inductor $L_1$, which makes the L-C tank (e.g., 2-pole) behave more as a current source driving a capacitor (e.g., 1-pole). The first loop restores the duty cycle and absorbs the new DC current level into the control ($V_{CTRL}$) level.

Figure 5:
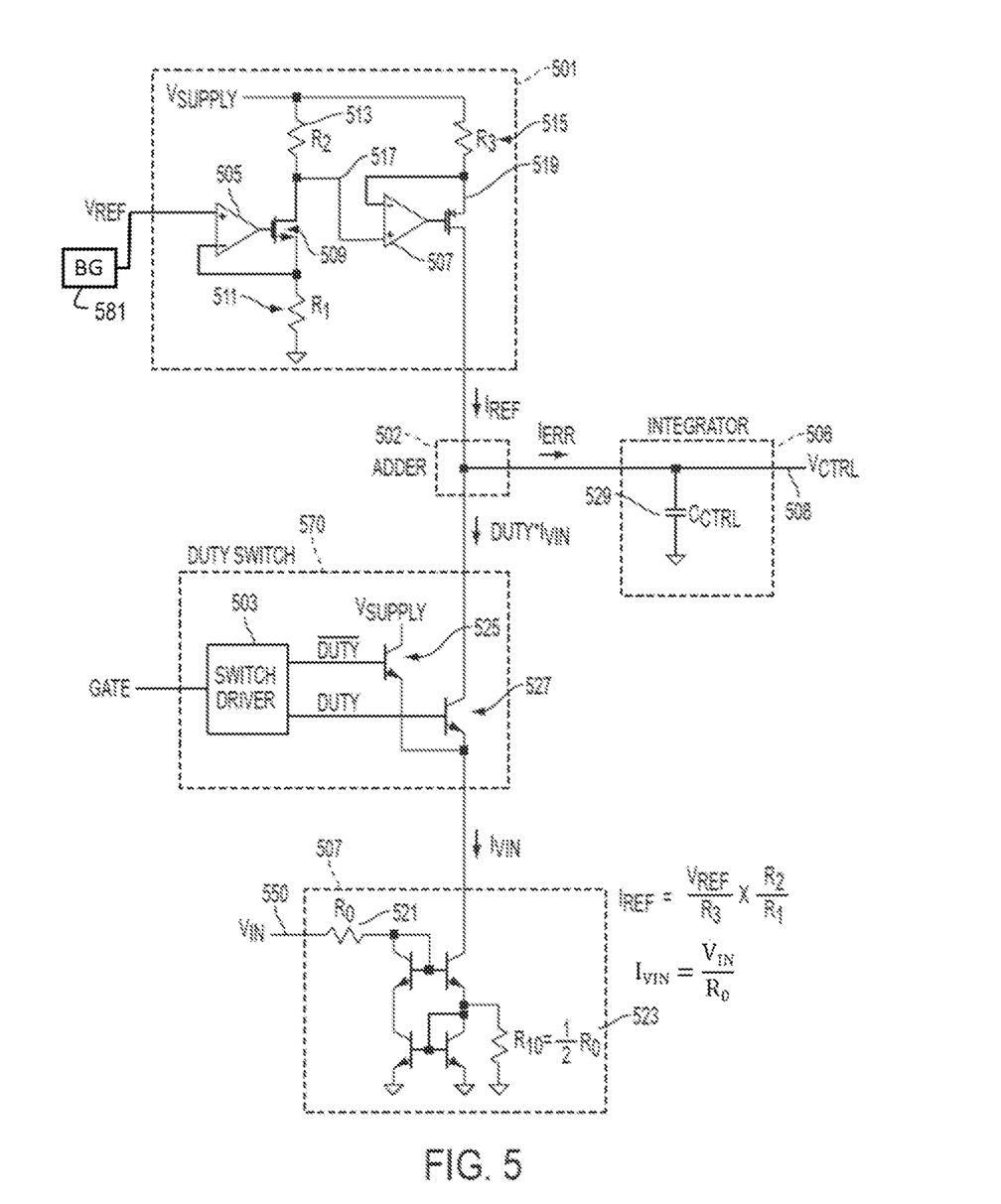
FIG. 5 illustrates an exemplary $V_{REF}$ circuit, duty switch, integrator, and $V_{IN}$ circuit, consistent with an embodiment of the invention.

FIG. 5 provides a more detailed view of the $V_{REF}$ circuit 501, summer 502, duty switch 570, integrator 506, and $V_{IN}$ circuit 507, consistent with an embodiment of the present invention. For example, the reference voltage $V_{REF}$ may be provided by a bandgap reference voltage source 581. In the example of FIG. 5, the $V_{REF}$ circuit 501 comprises two operational amplifiers (i.e., 505 and 507) configured as unity gain buffers. Due to the virtual short across the positive and negative terminals of the operational amplifier 505, voltage $V_{REF}$ is provided across resistor $R_1$ (511). Accordingly, the current through $R_1$ is $V_{REF}/R_1$. The current through resistor $R_2$ (513) is substantially similar to that of $R_1$ (511). Thus, the voltage at the positive terminal of the second operational amplifier 507 is $V_{SUPPLY}$ minus the voltage drop across $R_2$. Due to the virtual short across the positive and negative terminals of second operational amplifier 507, the voltage at node 519 is substantially similar to the voltage at node 517.

The resulting current $I_{REF}$ is provided by Equation 3 below:

$$I_{REF} = \frac{V_{REF}}{R_3} \times \frac{R_2}{R_1} \quad [3]$$

The $V_{IN}$ circuit 507 converts the input voltage $V_{IN}$ 550 into a current $I_{VIN}$. In the example of FIG. 5, $V_{IN}$ circuit 507 comprises a current mirror that includes several bipolar transistors and two resistors $R_0$ (521) and $R_{10}$ (523). For example, the resistance of resistor $R_{10}$ (523) is half the resistance of resistor $R_0$ (521). In one embodiment, the current mirror of the $V_{IN}$ circuit 507 is configured as a Wilson current mirror with supplemental resistor $R_{10}$ (523).

$$I_{VIN} = \frac{V_{IN}}{R_O} \quad [4]$$

In the example of FIG. 5, the duty switch 570 comprises a switch driver 503 and bipolar transistors 525 and 527. In one embodiment, when the voltage at the gate of the duty switch 570 is HIGH, bipolar transistor 525 is turned OFF while bipolar transistor 527 is turned ON. When the voltage at the gate of the duty switch 570 is LOW, bipolar transistor 525 is turned ON while bipolar transistor 527 is turned OFF.

In one embodiment, integrator 506 is as simple as a capacitor (e.g., $C_{CTRL}$ 529). In various other embodiments, the integrator 506 comprises an op-amp with resistive input and capacitive feedback, or a transconductance amp, where the output current drives a capacitive load. In the example of FIG. 5, the $V_{REF}$ and $V_{IN}$ voltages that were converted to currents by the $V_{REF}$ circuit 501 and the $V_{IN}$ circuit 507 respectively, are summed up (e.g., by adder 502) and provided to capacitor $C_{CTRL}$ 529 for integration.

Figure 6:
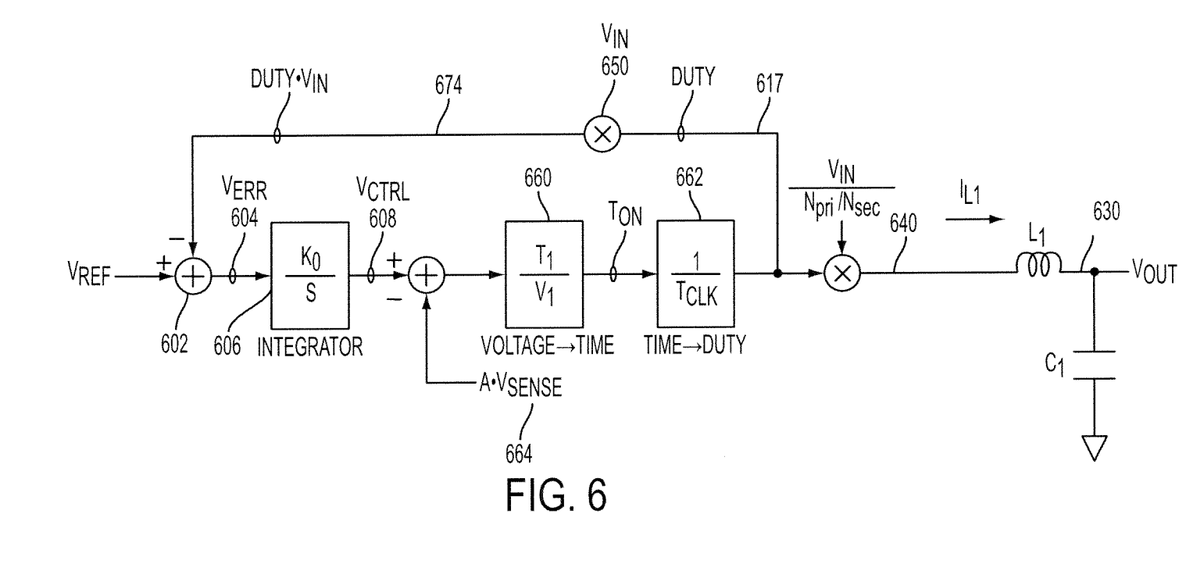
FIG. 6, which illustrates a system function representation of an embodiment of the invention.

Reference now is made to FIG. 6, which illustrates a system function representation of an embodiment of the invention. In the example of FIG. 6, the integrator 606 (e.g., representative of integrator 306 of circuit 300) has a scaling constant $K_0$. The current sense feedback signal $V_{SENSE}$ 664 (which may be amplified, as shown) subtracts from the control signal $V_{CTRL}$ 608 (e.g., which represents adding to the ramp signal $V_{RAMP}$ 313 in circuit 300). For example, the timing ramp 312 and comparator 310 of circuit 300 may define a voltage-to-time function that is represented by block 660, which multiplies by a time and divides by a voltage, (i.e., $T_1/V_1$), with $T_{ON}$ being the resulting ON-time variable. The values $T_1$ and $V_1$ represent arbitrary scaling constants of the voltage-to-time function. As discussed later, in one embodiment, particular selection in scaling may be advantageous. For example, the slope of the conversion is made proportional to the $V_{IN}/T_{CLK}$ such that the time constant (e.g., Tau) is stable (e.g., remains constant). In one embodiment, $T_1$ is made proportional to $T_{CLK}$ by replicating the internal current, capacitance, and threshold voltage that sets the oscillator period.

The clock 318 and the S-R latch 316 of circuit 300 translate time into a duty cycle, which is represented by scaling block 662, which divides the ON-time by the clocking period, $T_{CLK}$. Averaged over each switching period, the duty switch effectively multiplies the input voltage $V_{IN}$ 650 by a normalized pulse and by the duty percentage. The secondary side switches perform a similar multiplication, except that the transformer X1 turns ratio is included in the scaling of the output voltage $V_{OUT}$ 630 from the duty signal DUTY at node 617.

The infinite (very high, in practice) DC gain of the integrator 606, ahead of the voltage-to-time 660 and time-to-duty 662 blocks in the forward path of the system function in FIG. 6, reduces non-ideal effects (e.g., offsets, delays, imprecise parameters) in those blocks.

In one embodiment, a characteristic time period ($T_0$) is defined from the block parameters, as provided by Equation 5 below:

$$\tau_0 \equiv \frac{1}{K_0} \cdot \frac{T_{CLK}}{T_1} \cdot \frac{V_1}{V_{IN}} \quad [5]$$

In one embodiment, the system function for the combined first and second feedback loops is provided by Equation 6 below.

$$DUTY(s) = \quad [6]$$
$$\frac{1}{V_{IN}} \cdot \left[ V_{REF} \cdot \left( \frac{1}{\tau_0 s + 1} \right) - A \cdot V_{SENSE} \cdot \frac{T_1}{T_{CLK}} \cdot \frac{V_{IN}}{V_1} \cdot \left( \frac{\tau_0 s}{\tau_0 s + 1} \right) \right]$$

As an initial matter, in the example above, the duty cycle is inversely proportional to the input voltage $V_{IN}$. Second, the system time constant $T_0$ may be a function of both the input voltage $V_{IN}$ and the clock period $T_{CLK}$. In one embodiment, To may be made into a constant by adjusting the slope of the timing ramp to be proportional to the input voltage $V_{IN}$ 650 (e.g., voltage feed-forward) and the clock frequency ($1/T_{CLK}$).

In one embodiment, the duty cycle is proportional to a fixed reference ($V_{REF}$) that may be low-pass filtered. In one embodiment, $V_{REF}$ is provided by a bandgap reference voltage source. In one embodiment, the current sense feedback influences the duty cycle through a high-pass filter to remove noise from node 617. Steady-state current levels (e.g., $I_S$ in circuit 300) should not affect the ideal duty cycle (e.g., DC and low frequency currents do not affect the duty cycle). Dynamic load current $I_L$ (e.g., through load 380 in circuit 300), especially in the high-frequency components of a fast step, is fed back to the primary side of the isolation barrier 342 to counteract ringing. In this regard, proper damping (e.g., critical-damping, over-damping, etc.) is provided when the integrator parameter $K_0$ is chosen in proper relation to the L-C ($L_1$ and $C_1$) tank natural frequency, the transformer turns ratio $N_{pri}/V_{sec}$, and the amplified current sense signal $A \cdot V_{SENSE}$ at node 376.

Figure 7:
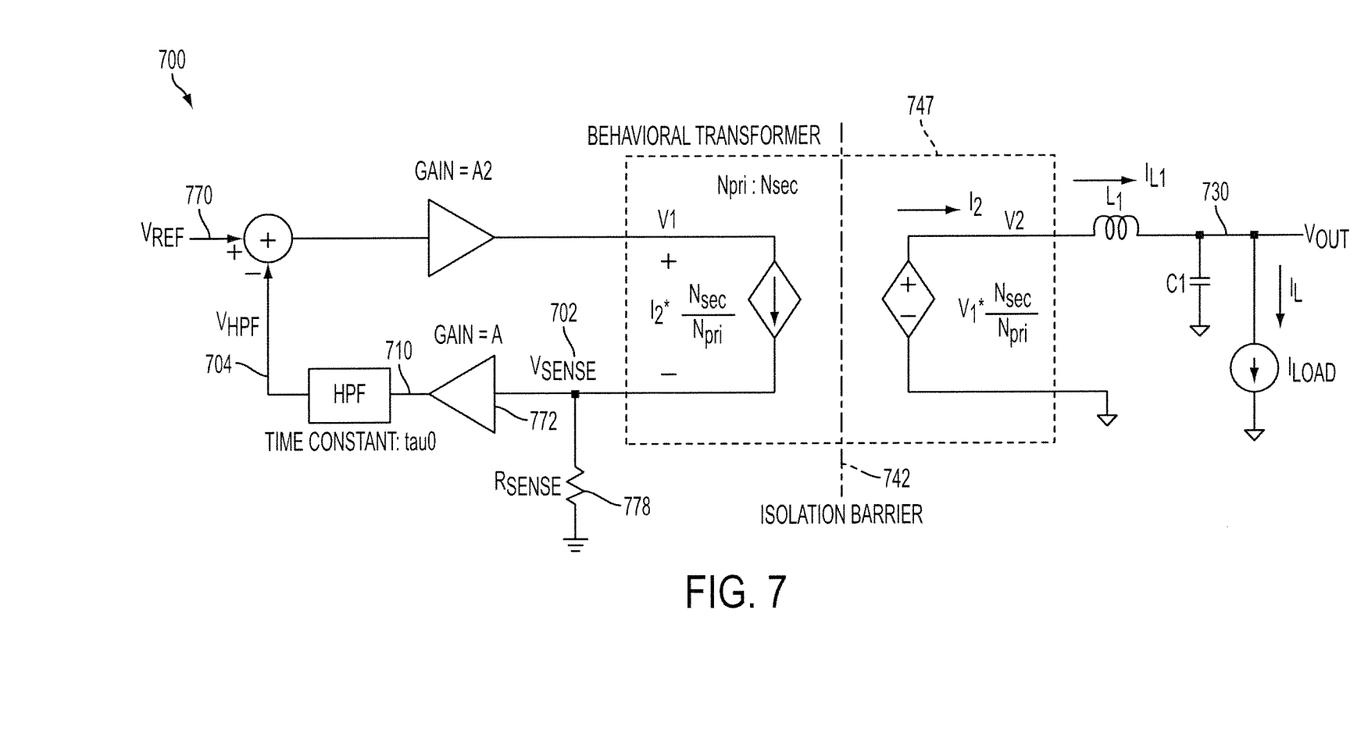
FIG. 7 illustrates a system function representation of a circuit that includes ringing compensation, consistent with an embodiment of the invention.

FIG. 7 illustrates a system function representation of a circuit including ringing compensation, consistent with an embodiment of the invention. In the example of FIG. 7, as discussed above, if there is a change in load, the transient response (e.g., at the output 730) node is affected. The system diagram 700 reduces ringing of $V_{LOAD}$ at node 730 by driving the inductor voltage (through the transformer 747) based on the measured current across sense resistor 778. In FIG. 7, the feedback system is represented by an amplified current sense 702 node (e.g., I to V) that provides a high-pass filter (HPF) signal at node 704.

In steady state operation the HPF 704 provides zero drive voltage adjustment to the steady state DC level $V_{REF}$, except for an insignificant amount due to inductor current ripple inherent to switching voltage regulators. For a positive load step, the inverting HPF 704 provides a negative voltage pulse that reduces the difference voltage across inductor $L_1$. For a negative load step, a similar positive pulse is applied to the inductor $L_1$.

For example, in typical switching regulators, the feedback loop uses knowledge of the inductor $L_1$ current and the load voltage 730 to effectively turn the inductor into a controlled current source. For example, the voltage across the inductor $L_1$ is controlled, thereby controlling the inductor $L_1$ current.

However, without knowledge of the actual load voltage 730 (e.g., at the right side of the inductor $L_1$), this second feedback loop monitors for changes in current in the primary side of the transformer (e.g., on the primary side of the isolation barrier) that indicate a change in inductor $L_1$ current. In this regard, compensation is provided (e.g., compensation voltage) to the left side of the inductor to dampen the ripple on the secondary side of the transformer. The HPF 704 keeps the feedback constant (e.g., zero) for steady state operation and provides correction to avoid substantial ringing at the output 730. It should be noted that the term "ringing" is used herein to describe output voltage (at node 730) oscillations, while the term "ripple" describes ramping up and down of the inductor current (e.g., when the applied voltage changes from ON to OFF).

The components, steps, features, objects, benefits and advantages that have been discussed herein are merely illustrative. None of them, nor the discussions relating to them, are intended to limit the scope of protection. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently. For example, any signal discussed herein may be scaled, buffered, scaled and buffered, converted to another mode (e.g., voltage, current, charge, time, etc.), or converted to another state (e.g., from HIGH to LOW and LOW to HIGH) without materially changing the underlying control method. Further, bipolar transistors (e.g., PNP or NPN) can be used instead of MOS transistors. A PNP may be used instead of NPN, and a PMOS may be used instead of NMOS. Accordingly, it is intended that the invention be limited only in terms of the appended claims. The systems described herein could be converted to equivalent digital logic functions and yet be within the scope of the same method. For example, a multiplier may be replaced with a digital multiplier or look-up table; the integrator can be replaced with an accumulator; the ramp timer can be replaced with a (e.g., clearable) up-counter; the comparator can be replaced with a bit test signal; the PWM can be digitized; etc.

The scope of the appended claims is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, system, or apparatus that comprises a list of elements does not include only those elements but may include other elements not expressly listed or inherent to such process, method, system, or apparatus. An element proceeded by "a" or "an" does not, without further constraints, preclude the existence of additional system elements in the process, method, system, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A switching regulator having a primary side and a galvanically isolated secondary side, and configured to provide a regulated voltage level to a load, the switching regulator comprising:
    a transformer having a primary winding on the primary side and a secondary winding on the secondary side;
    an input node on the primary side;
    an output node on the secondary side and coupled to the load;
    a first switch on the primary side configured to control current flow through the primary winding of the transformer;
    a first feedback control loop including the input node and configured to regulate a first duty cycle of the first switch to provide a constant average value at the output node; and
    a duty switch in the first feedback control loop having a first terminal coupled to the input node,
    wherein the first feedback control loop is responsive only to primary side signal values,
    wherein the first feedback loop is configured to use a second duty cycle of the duty switch and a voltage at the input node to create a replica of the regulated voltage level of the output node, and
    wherein the second duty cycle of the duty switch matches the first duty cycle of the first switch.

2. The switching regulator of claim 1, wherein the product of the duty cycle of the first switch and the voltage at the input node represents the voltage at the output node.

3. The switching regulator of claim 1, further comprising an integrator configured to:
    (i) receive a difference between a reference signal and a product of the primary side signal values; and
    (ii) provide a control signal based on an integration of the difference.

4. The switching regulator of claim 3, wherein the reference signal is provided by a bandgap reference and the product of the primary side signal values comprises the first duty cycle times the voltage at the input node.

5. The switching regulator of claim 1, further comprising a second feedback control loop configured to regulate a ringing at the output node, wherein the second feedback control loop is responsive only to one or more primary side signal values.

6. The switching regulator of claim 5, further comprising a sense resistor on the primary side, wherein the sense resistor is:
    (i) configured to sense a current through the primary winding of the transformer; and
    (ii) a part of the second feedback control loop.

7. The switching regulator of claim 6, wherein the current sensed by the sense resistor represents current that flows through the load.

8. The switching regulator of claim 6, further comprising:
    a ramp circuit configured to provide a ramp signal based on the voltage at the input node and a clock signal;
    an integrator configured to:
        (i) receive a difference between a reference signal and a product of the primary side signal values; and
        (ii) provide a control signal based on an integration of the difference;
    a comparator configured to:
        (i) compare the sum of the ramp signal and an amplified current sensed by the sense resistor to the control signal of the integrator; and
        (ii) provide a reset signal based on the comparison.

9. The switching regulator of claim 8, further comprising a latch circuit having an output coupled to a control input of the first switch and configured to:
    receive the clock signal and the reset signal as inputs; and
    control the first duty cycle of the first switch based on the received clock signal and reset signals.

10. In a switching regulator comprising: a primary side that is galvanically isolated from a secondary side; a transformer having a primary winding on the primary side and a secondary winding on the secondary side; an input node on the primary side; a summing node on the primary side; an output node on the secondary side and coupled to a load; a switch coupled to the primary winding and configured to control current flow through the primary winding, and a duty switch coupled to the input node and having a second duty cycle that matches a first duty cycle of the first switch; a method of regulating a voltage at the output node, the method comprising:
    determining a voltage at the input node;
    determining the first duty cycle of the first switch; and providing a first feedback signal to the summing node to create an error signal that is used to set the first duty cycle of the first switch, wherein the first feedback signal is:
(i) based on the voltage at the input node and the first duty cycle of the first switch; and
(ii) a replica of a voltage at the output node.

11. The method of claim 10, further comprising:
providing a control signal by integrating the error signal, wherein the error signal is a difference between a reference signal and the feedback signal;
comparing the control signal to a ramp signal, wherein the ramp signal is based on a clock signal and the voltage at the input node; and
providing a reset signal based on the comparison, wherein the reset signal is used to change a state of the first switch.

12. The method of claim 11, further comprising controlling the first switch to be:
in a first state on a first edge of the clock signal; and
in a second state on a first edge of the reset signal.

13. The method of claim 11, further comprising receiving the reference signal from a bandgap reference.

14. The method of claim 10, further comprising providing a second feedback control loop configured to regulate a ringing at the output node, wherein the second feedback control loop is based on only one or more primary side signal values.

15. The method of claim 14, further comprising:
sensing a current through the primary winding of the transformer that is representative of the current that flows through the load.

16. The method of claim 14, further comprising:
providing a ramp signal based on the voltage at the input node and a clock signal;
determining a difference between a reference signal and the product of the voltage at the input node and the second duty cycle; and
providing a control signal based on an integration of the difference;
comparing the sum of the ramp signal and an amplified sensed current through the primary winding to the control signal; and
providing a reset signal based on the comparison, wherein the reset signal is used to change a state of the first switch.

17. The method of claim 16, further comprising controlling the first duty cycle of the first switch based on the clock signal and the reset signal.

18. A switching regulator having a primary side and a galvanically isolated secondary side, and configured to provide a regulated voltage level to a load, the switching regulator comprising:
a transformer having a primary winding on the primary side and a secondary winding on the secondary side;
an input node on the primary side;
an output node on the secondary side and coupled to the load;
a first switch coupled to the primary winding and configured to control current flow through the primary winding;
a sense resistor on the primary side coupled to the primary winding and configured to sense a current through the primary winding of the transformer;
a duty switch coupled to the input node and having a second duty cycle that matches a first duty cycle of the first switch; and
a feedback control loop configured to dampen a ringing at the output node by adjusting the first duty cycle of the first switch, wherein the feedback control loop is responsive only to primary side signal values.

19. The switching regulator of claim 18, wherein:
the primary side signal values comprise the current sensed by the sense resistor, and
the current sensed by the sense resistor represents current that flows through the load.

20. The switching regulator of claim 18, further comprising an integrator configured to:
(i) receive a difference between a reference signal and a product of the first duty cycle of the first switch times a voltage at the input node; and
(ii) provide a control signal based on an integration of the difference.

21. The switching regulator of claim 20, wherein the reference signal is provided by a bandgap reference and the product of the primary side signal values comprises the first duty cycle times the voltage at the input node.

22. The switching regulator of claim 19, further comprising:
a ramp circuit configured to provide a ramp signal based on the voltage at the input node and a clock signal;
an integrator configured to:
(i) receive a difference between a reference signal and a product of the first duty cycle of the first switch times the voltage at the input node; and
(ii) provide a control signal based on an integration of the difference; and
a comparator configured to:
(i) compare the sum of the ramp signal and an amplified current sensed by the sense resistor to the control signal of the integrator; and
(ii) provide a reset signal based on the comparison.

23. The switching regulator of claim 22, further comprising a latch circuit having an output coupled to a control input of the first switch and configured to:
receive the clock signal and the reset signal as inputs; and
control the first duty cycle of the first switch based on the received clock signal and reset signals.

* * * * *